US004001682B2

United States Statutory Invention Registration [19]

[11] Reg. Number: H1682

[45] Published: Oct. 7, 1997

Brown et al.

[54] METHOD FOR PRODUCING CERAMIC COATINGS ON FIBERS

[75] Inventors: Peter W. Brown, Bellbrook; Randall S. Hay, Beavercreek, both of Ohio

[73] Assignee: The United States of America as represented by the Secretary of the Air Force, Washington, D.C.

[21] Appl. No.: 653,858

[22] Filed: May 28, 1996

[51] Int. Cl.[6] ..... C25D 11/04

[52] U.S. Cl. ..... 205/509

[58] Field of Search ..... 204/490, 491

[56] References Cited

U.S. PATENT DOCUMENTS

| | | | |
|---|---|---|---|
| 4,687,652 | 8/1987 | Yoldas et al. | 423/327 |
| 4,935,139 | 6/1990 | Davidson et al. | 210/490 |
| 5,039,550 | 8/1991 | Malghan | 427/57 |
| 5,137,852 | 8/1992 | Morgan et al. | 501/95 |
| 5,336,381 | 8/1994 | Dalzell, Jr. et al. | 204/491 |
| 5,340,779 | 8/1994 | Kerkar | 501/80 |
| 5,468,358 | 11/1995 | Ohkawa et al. | 204/181.5 |

*Primary Examiner*—Charles T. Jordan
*Assistant Examiner*—Meena Chelliah
*Attorney, Agent, or Firm*—Charles E. Bricker; Thomas L. Kundert

[57] ABSTRACT

Electrophoretic deposition (EPD) can be advantageously employed to uniformly coat or impregnate an array or preform of fibers with a ceramic material. As a result, more efficient methods for making composite materials of superior quality are provided. The method of this invention comprises the steps of: (a) providing an array of reinforcing fibers which array has electrically conducting characteristics; (b) disposing the array in a liquid ceramic polymer sol in juxtaposition to a surface of a first electrode, the sol including molecules having an electrical charge; (c) providing a second electrode in contact with the sol and spaced from the first electrode; (d) creating an electric field in the polymeric sol by applying voltage to the electrodes so that the molecules migrate toward the surface of the first electrode where the migrating molecules aggregate against the fiber array, thereby producing a polymer-coated fiber array; (e) removing the polymer-coated fiber array from the sol; and (f) heat treating the polymer-coated fiber array to convert the polymer sol to a ceramic material, thereby providing a ceramic coating on the fiber array. The ceramic-coated fiber array can be used to fabricate a fiber-reinforced composite material by the additional steps of: (g) combining the ceramic-coated array with a second ceramic matrix powder to provide a composite pre-form structure; and (h) consolidating the composite pre-form structure by subjecting same to heat under conditions which consolidate the ceramic-coated fiber with the second ceramic matrix powder and thereby form a dense fiber-reinforced composite material.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PRODUCING CERAMIC COATINGS ON FIBERS

The invention described herein may be manufactured and used by or for the Government of the United States for all governmental purposes without the payment of any royalty.

BACKGROUND OF THE INVENTION

The present invention is related generally to a method for coating or processing reinforcing agents, such as stiff fibers, that are used to increase the toughness of brittle materials, such as ceramics and inorganic glasses and other materials that exhibit the high temperature properties, such as high strength and low ductility, of ceramics.

Ceramics and other brittle materials, such as inorganic glasses, retain strength and low ductility at high temperatures but exhibit low toughness, i.e., resistance to crack propagation. Although they exhibit high strength, it is readily lost through surface damage. Reinforcing agents can be added to such materials in order to increase the toughness of such materials. The introduction of a reinforcing agent into a ceramic or other brittle material produces a composite material, which consists of the reinforcing agent and a matrix of the brittle material. The composite material has the desirable properties, such as strength at high temperatures of the unreinforced material, but has greatly increased toughness compared to the unreinforced material. These advantageous properties of reinforced materials, such as toughness and strength at high temperature, can be lost, however, if the reinforcing agent reacts chemically with the matrix or with the environment. Coating the reinforcing agent with a suitable material, such as alumina, minimizes reactions of the agent with the matrix and/or with the environment during processing and use of the material.

Fiber reinforced ceramics consist of a ceramic, glass-ceramic, inorganic-glass or other brittle matrix that is reinforced with a fiber or other agent, such as a whisker or platelet. Typical reinforcing agents consist of high modulus carbon, silicon carbide, silicon carbide deposited on carbon filament, alpha -alumina, alumina-borosilicate, boron, tungsten, and niobium stainless steel.

Numerous processes exist for the fabrication of fiber reinforced ceramic composites. These processes generally involve two stages: incorporation of the fibers into the unconsolidated matrix and consolidation of the matrix. Hot-pressing is the most widely used technique for preparing fiber reinforced ceramic composites. Hot-pressing achieves full density and good mechanical properties in the resulting composite. Complex shapes, however, cannot be readily fabricated by hot-pressing. As an alternative, pressureless sintering is often used for fabricating near-net-shape components. This method is, however, impeded by the stress generation that is caused by differential shrinkage between the ceramic matrix and the reinforcing agents.

In situ observations of the sintering process for composites of silicon carbide fibers in an alumina matrix reveal that these stresses initiate during the heating cycle before the actual sintering temperature of 1450° C. is reached. Because of the low matrix density and consequent low matrix strength at the point of stress initiation, stresses that develop during the early stage of sintering are found to be the most detrimental to achieving a damage-free composite. Therefore, it is necessary to delay stress development until the matrix density is sufficiently high to withstand the stresses associated with the reinforcing fibers. There is, thus, a need to develop processing routes that delay stress generation during the early stages of sintering, specifically during the heating cycle.

The fiber reinforced ceramic composite that is produced by the addition of a fiber component to a ceramic matrix offers enhanced fracture toughness and strength. The toughening of the fiber reinforced ceramic composite occurs because of an increase in the fracture energy of the reinforced ceramic matrix compared to that of the corresponding monolithic matrix. Further, crack deflection around the fiber increases the stress that is required to break the material and/or increases the amount of energy that is needed to pull the fiber from the surrounding matrix. This in turn increases flaw tolerance in the fiber reinforced ceramic composite, which results in graceful failure thereof.

In a fiber reinforced ceramic composite there exist three layers of materials: the fiber, the interface at the fiber and matrix, and the matrix. The interface at the fiber and the matrix plays an important role in imparting toughness to the composite material because the chemical and physical properties of the interface affect the thermodynamics and kinetics of the reactions of the overall composite system. Coating the reinforcing agent with an appropriate material can be used to minimize reactions between the agent and the matrix and/or the environment during processing and use. In general, the fracture toughness and strength increase of the composite are a direct consequence of fiber reinforcements that have a higher modulus and strength than the matrix. This increase in fracture toughness and strength can only be realized, however, if the interface is able to transfer load from the matrix to the reinforcing fiber.

Thus, optimization of the mechanical properties of the interface has become a key factor in developing reinforced composite materials, such as fiber reinforced ceramic composites. The interface must have properties that maximize the fracture strength and toughness of the composite. Since the choices of fiber and matrix are limited, optimization of the mechanical properties is achieved by the methods used to coat or process the fibers or other reinforcing agents. Several methods have been developed and are currently being used for coating reinforcing agents. These methods include slurry formation followed by fusing, sol-gel, chemical vapor deposition and thermal spraying. None of these methods, however, permit sufficient control of interface chemistry to optimize the mechanical properties thereof.

There is, thus, not only a need to develop processing routes that delay stress generation during the early stages of sintering, but a need to develop coating and processing methods that permit the control of interface chemistry and thereby improve the strength and toughness of the composite material.

The alumina-silica binary phase diagram indicates that mullite ($3Al_2O_3.2SiO_2$) is the only thermodynamically stable phase between alumina and silica. Hence, upon exposure to elevated temperatures in an oxidizing environment, the resultant formation of a silica film on silicon carbide fibers should be stable in the presence of a mullite coating and should reduce the amount of bonding between fibers and matrix.

Commercially available mullite always contains significant amounts of impurities such as silica, iron oxide, and titania. These impurities influence the properties of the mullite, and can, in turn, affect the ceramic compositions in which the mullite may be imbedded.

High purity, submicron mullite powder can be prepared by hydrolytically decomposing a mixture of stoichiometric amounts of aluminum tris-isopropoxide and a silicon tetraalkoxide in the presence of a weak base or very dilute mineral acid. Mullite has also been prepared by reacting clear, aqueous alumina sol with silicon tetraethoxide. This high purity mullite powder could be employed to coat fiber reinforcement for ceramic composites; however, one disadvantage of liquid-based coating methods is that the individual filaments of a fiber tow or cloth are not uniformly coated because the coating cements the filaments together or forms thin bridges between filaments.

We have discovered a method to more uniformly coat fiber tow or cloth.

It is an object of the present invention to provide an improved method for coating continuous tow or cloth.

It is another object of this invention to provide an improved method for fabricating ceramic composite materials.

Other objects and advantages of the present invention will be apparent to those skilled in the art.

SUMMARY OF THE INVENTION

It has now been found that electrophoretic deposition (EPD) can be advantageously employed to uniformly coat or impregnate an array or preform of fibers with a ceramic material. As a result, more efficient methods for making composite materials of superior quality are provided.

The method of this invention comprises the following steps:

(a) providing an array of reinforcing fibers which array has electrically conducting characteristics;

(b) disposing the array in a liquid ceramic polymer sol in juxtaposition to a surface of a first electrode, the sol including molecules having an electrical charge;

(c) providing a second electrode in contact with the sol and spaced from the first electrode;

(d) creating an electric field in the polymeric sol by applying voltage to the electrodes so that the molecules migrate toward the surface of the first electrode where the migrating molecules aggregate against the fiber array, thereby producing a polymer-coated fiber array;

(e) removing the polymer-coated fiber array from the sol; and (f) heat treating the polymer-coated fiber array to convert the polymer sol to a first ceramic material, thereby providing a first ceramic coating on the fiber array.

The ceramic-coated fiber array can be used to fabricate a fiber-reinforced composite material by the additional steps of:

(g) combining the first ceramic-coated array with a second ceramic matrix powder to provide a composite preform structure; and (h) consolidating the composite pre-form structure by subjecting same to heat under conditions which consolidate the first ceramic-coated fiber with the second ceramic matrix powder and thereby form a dense fiber-reinforced composite material.

DETAILED DESCRIPTION OF PREFERRED EMBODIMENTS

Electrophoretic deposition generally involves the mechanism of electrophoresis which constitutes the motion of charged particles in a liquid medium under the influence of an applied electrical field. Generally, an article being coated is placed in an electrodeposition bath and connected as either the anode or the cathode. A voltage is then applied between the two electrodes so that the current passes from anode to cathode, producing an electric current and causing a coating to be deposited.

With respect to the present invention, a fibrous array is first treated to reduce its resistivity so that it can be used as an electrode in the electrophoresis process. A convenient treatment is to dip-coat the fibrous array in a pitch/toluene solution, then heat-treat the dipped fibrous array at an elevated temperature, e.g., about 800° C., in an inert atmosphere, such as argon, thus producing a carbon-coated fibrous array.

The thus-treated fibrous array is immersed in a ceramic polymer sol and connected, in suitable manner, to a voltage source, as the anode. A suitable voltage and voltage gradient is employed to cause migration of the polymeric sol to effectively occur. The presently preferred polymer sol is a mullite sol, which is described hereinafter, although other ceramic polymer sols can be employed. Generally a voltage of between about 10 volts and 1000 volts is used, and commonly a voltage in the range of about 240 to 320 volts is employed. A voltage gradient in the range of 10 to 1000 volts per cm is generally employed.

The fibrous array which is used can be of any suitable character, such as woven fiber cloth arrangements, 3-dimensional woven structures, e.g. cubic, parallel fiber lay-ups, or even random fiber arrangements, such as are found in air-laid or water-laid materials; the latter are acceptable so long as the fiber array has sufficient wet-strength to retain its integrity in a liquid environment wherein the electrophoretic deposition will take place. Generally, fibers which are used are in the form of continuous fibrous tows constituting bundles of about 2,000 to about 3,000 fibers or microfilaments per tow, with the individual fibers, usually having a diameter of about 10 μm or less. As employed herein, the term "continuous" refers to fibers or filaments having a substantial length such that they might be woven into a fabric or like 2-dimensional or 3-dimensional structure, if desired. Generally the fibers that are used are at least about 10 cm. in length and between about 5 and about 15 microns in diameter. However, larger fibers can be used, e.g. up to about 150 to 200 microns in diameter if desired for particular purposes.

The fibers employed are preferably fibers that are commercially available, for example, NEXTEL $Al_2O_3$-$SiO_2$ fibers about 10 microns in diameter, or silicon carbide fibers about 5 to 15 microns in diameter, examples of which include those sold under the trademarks "NICALON" and "HPZ". However, a wide variety of continuous multifilament refractory fiber tows can be employed in the practice of the present invention. Examples of such fibers include those formed from silicon dioxide ($SiO_2$), aluminum silicates, such as mullite, aluminum oxide ($Al_2O_3$), titanium oxide ($TiO_2$), zirconium silicate, silicon carbide (SIC), silicon nitride and boron nitride (BN), as well as from other high temperature oxides, nitrides, carbides, silicates and the like known in the art of refractory fibers as useful in making composites. Generally, silicon carbide, carbon, and silicon nitride fibers are preferred. Tows made from SiC are commercially available from Nippon Carbon Co. of Tokyo, Japan, under the trademark NICALON, and tows made from silicon nitride are sold under the trademark HPZ. Carbon fibers are available from a number of sources, such as Hercules, Ashland, BASF, and Amoco. Similar tows of alumina-silica (often termed aluminum silicate) blends, such as mullite, are commercially available under the trademark "NEXTEL", and these fibers can also be obtained having small percentages of various additives, such as boria ($B_2O_3$). Nearly all of these fibers can also be obtained in woven form.

A polymeric mullite sol can be prepared as disclosed by Yoldas et al, U.S. Pat. No. 4,687,652, issued Aug. 18, 1987, which is incorporated herein by reference. Briefly, the synthesis comprises the following steps: First, a dilute alcoholic silicon alkoxide solution is prepared and partially hydrolyzed. The alcohol diluent can be a $C_1$ to $C_4$ alcohol, such as methanol, ethanol, n-propanol, i-propanol, n-butanol, i-butanol, t-butanol or sec-butanol. A stoichiometric amount of an aluminum alkoxide is added to the partially hydrolyzed, dilute silicon alkoxide solution. The resulting mixture is allowed to react for about 8 to 48 hours at an elevated temperature about 0° to 50° C. below the normal boiling temperature of the alcohol diluent. The solution may be stirred, if desired, during the reaction period to ensure thorough mixing. Following the reaction period, the solution is cooled to ambient temperature. The following reactions illustrate the reaction sequence:

$$Si(OC_2H_5)_4+H_2O\rightarrow(HO)Si((OC_2H_5)_3+C_2H_5OH$$

$$(H_9C_4O)_3Al+(HO)Si((OC_2H_5)_3\rightarrow(H_9C_4O)_2Al(O)Si((OC_2H_5)_3+C_4H_9OH$$

A silica polymer sol can be prepared in similar manner using only a silicon alkoxide. An alumina polymer sol can likewise be prepared. Minor amounts of alkali metal or alkaline earth metal ions can be added to the polymer sol to alter the characteristics of the sol.

The concentration of the as-prepared polymeric sol is too high for use in the EPD process; prior to use, the sol is diluted with dry ethanol or other suitable alcohol to a final concentration of about 2 to 10 g/l. A mineral acid, such as concentrated nitric acid, is then added until the pH of the solution is about 4.0. This pH adjustment step provides a non-zero surface charge on the polymeric sol molecules, allowing their use in the EPD process.

The EPD process can be conducted in batch or continuous manner. A simple continuous-mode EPD coating apparatus comprises a container for holding the polymeric mullite sol; a roller located within the container and below the surface of the sol; a suitable cathode, such as a Pt/Rh wire basket; an anode roller located outside the container; a power source; and associated control circuitry. In practice, the carbon-coated fibrous array is continuously passed over the anode roller and around the submersed roller, while a suitable voltage is applied to the electrodes. The speed of transport of the fibrous array through the polymeric mullite sol is adjusted, depending on the desired coating thickness, sol concentration, applied voltage, and the like, to allow for a coating residence time of about 10 seconds to 5 minutes. The polymeric mullite sol-coated fibrous array may then be heat-treated at about 800° to 1000° C. for about 1 to 24 hours in an inert atmosphere, such as argon, to convert the sol to a crystalline mullite coating.

As one example, previously carbon-coated strips, about 1.5 cm wide and 120 cm long, of NICALON cloth were coated with a polymeric mullite sol using a simple continuous EPD apparatus. The EPD processing conditions were: sol concentration, 3 volume percent; voltage, 100 volts; current, 20 mA; voltage gradient, 200 volts/cm; residence time, 1 minute. The sol coating was overall adherent to the cloth. The sol-coated cloth was heat-treated at 900° C. in flowing Ar for 1 hour, providing a coating with a thickness of about 0.25 μm. The coatings consisted of equiaxed mullite grains on the order of 20–50 nm in diameter.

The mullite-coated fibers are then used to prepare a fiber-reinforced ceramic composite using techniques known in the art. For example, a composite preform can be prepared by alternately layering a plurality of layers of fiber and matrix powder. The preform can then be pressureless-sintered at about 1700° C., and then hot-isostatically pressed at about 1700° C. with about 200 MPa applied pressure.

Various modifications may be made in the instant invention without departing from the spirit and scope of the appended claims.

We claim:

1. A method of making a fiber-reinforced ceramic composite material, which method comprises the following steps:

(a) providing an array of reinforcing fibers which array has electrically conducting characteristics;

(b) connecting said array to a voltage source as a first electrode and disposing said array in a liquid ceramic polymer sol, said sol including molecules having an electrical charge;

(c) providing a second electrode in contact with said sol and spaced from said first electrode;

(d) creating an electric field in said polymeric sol by applying voltage to said electrodes so that said molecules migrate toward and deposit against said fiber array, to produce a polymer-coated fiber array;

(e) removing said polymer-coated fiber array from said sol; and (f) heat treating said polymer-coated fiber array to convert said polymer sol to a ceramic material, to provide a ceramic coating on said fiber array.

2. The method of claim 1 wherein said reinforcing fibers are coated with carbon.

3. The method of claim 2 wherein said reinforcing fibers are silicon carbide.

4. The method of claim 1 wherein said liquid ceramic polymer sol is a mullite sol.

5. A method of making a fiber-reinforced ceramic composite material, which method comprises the following steps:

(a) providing an array of reinforcing fibers which array has electrically conducting characteristics;

(b) connecting said array to a voltage source as a first electrode and disposing said array in a liquid ceramic polymer sol, said sol including molecules having an electrical charge;

(c) providing a second electrode in contact with said sol and spaced from said first electrode;

(c) providing a second electrode in contact with said sol and spaced from said first electrode;

(d) creating an electric field in said polymeric sol by applying voltage to said electrodes so that said molecules migrate toward and deposit against said fiber array, to produce a polymer-coated fiber array;

(e) removing said polymer-coated fiber array from said sol;

(f) heat treating said polymer-coated fiber array to convert said polymer sol to a first ceramic material, to provide a first ceramic coating on said fiber array;

(g) combining said first ceramic-coated array with a second ceramic matrix powder to provide a composite pre-form structure; and (h) consolidating said composite pre-form structure by subjecting same to heat under conditions which consolidate said first ceramic-coated fiber with said second ceramic matrix powder and thereby form a dense, fiber-reinforced composite material.

6. The method of claim 5 wherein said reinforcing fibers are coated with carbon.

7. The method of claim 6 wherein said reinforcing fibers are silicon carbide.

8. The method of claim 5 wherein said liquid ceramic polymer sol is a mullite sol.

9. The method of claim 5 wherein said second ceramic matrix powder is alumina.

* * * * *